United States Patent
Catt et al.

(10) Patent No.: US 8,972,101 B2
(45) Date of Patent: Mar. 3, 2015

(54) METHOD FOR PREDICTING A HORIZONTAL STABILIZER FAULT

(71) Applicant: GE Aviation Systems Limited, Cheltenham (GB)

(72) Inventors: Christopher Joseph Catt, Southampton (GB); Mark John Robbins, Eastleigh (GB)

(73) Assignee: GE Aviation Systems Limited, Cheltenham (GB)

( * ) Notice: Subject to any disclaimer, the term of this patent is extended or adjusted under 35 U.S.C. 154(b) by 244 days.

(21) Appl. No.: 14/012,223

(22) Filed: Aug. 28, 2013

(65) Prior Publication Data

US 2014/0229056 A1    Aug. 14, 2014

(51) Int. Cl.
*B64C 13/00* (2006.01)
*B64C 9/00* (2006.01)
*B64D 45/00* (2006.01)
*B64F 5/00* (2006.01)
*B64C 19/00* (2006.01)

(52) U.S. Cl.
CPC .............. *B64F 5/0045* (2013.01); *B64D 45/00* (2013.01); *B64F 5/00* (2013.01); *B64C 9/00* (2013.01); *B64C 19/00* (2013.01); *B64C 13/00* (2013.01)
USPC ............... 701/31.9; 701/3; 701/14; 701/32.1; 701/33.4

(58) Field of Classification Search
CPC .......... B64C 9/00; B64C 13/00; B64C 19/00; B64C 45/00; B64C 5/00; B64C 5/0045
See application file for complete search history.

(56) References Cited

U.S. PATENT DOCUMENTS

| 5,002,240 | A | 3/1991 | du Pont | |
| 6,243,628 | B1 * | 6/2001 | Bliley et al. | 701/29.4 |
| 2003/0080256 | A1 * | 5/2003 | Urnes et al. | 244/194 |
| 2013/0001357 | A1 | 1/2013 | Cyrot | |
| 2013/0197725 | A1 * | 8/2013 | O'Dell et al. | 701/14 |

FOREIGN PATENT DOCUMENTS

| EP | 0316651 A1 | 5/1989 |
| EP | 1759988 A2 | 3/2007 |
| GB | 2300167 A * | 10/1996 |

OTHER PUBLICATIONS

Search Report from GB Application No. 1302280.1 dated Jul. 1, 2013.

* cited by examiner

*Primary Examiner* — Michael J Zanelli
(74) *Attorney, Agent, or Firm* — General Electric Company; William Scott Andes

(57) ABSTRACT

A method of predicting a horizontal stabilizer system fault in an aircraft, where the method includes receiving data relevant to a characteristic of the pitch of the aircraft during flight, comparing the received data to a reference pitch characteristic, predicting a fault in the horizontal stabilizer system based on the comparison, and providing an indication of the predicted fault.

20 Claims, 2 Drawing Sheets

METHOD FOR PREDICTING A HORIZONTAL STABILIZER FAULT

CROSS-REFERENCE TO RELATED APPLICATIONS

This application claims priority under 35 U.S.C. §119 to British Patent Application No. 13022801, filed Feb. 8, 2013, the disclosure of which is incorporated herein by reference in its entirety.

BACKGROUND OF THE INVENTION

Contemporary aircraft include horizontal stabilizers to control the up-and-down, or pitching, motion of the aircraft nose. Elevators on the horizontal stabilizers move and vary the amount of force generated by the tail surface. The elevators are used to generate and control the pitching motion of the aircraft. Currently, airlines and maintenance personnel wait until a fault or problem occurs with the system and then attempt to identify the cause and fix it either during scheduled or, more likely, unscheduled maintenance. Fault occurrences are also recorded manually based on pilot discretion.

BRIEF DESCRIPTION OF THE INVENTION

In one embodiment, the invention relates to a method of predicting a horizontal stabilizer system fault in an aircraft, including receiving data relevant to a characteristic of the pitch of the aircraft during flight, comparing the received data to a reference pitch characteristic, predicting a fault in the horizontal stabilizer system based on the comparison, and providing an indication of the predicted fault.

DESCRIPTION OF EMBODIMENTS OF THE INVENTION

Figure 1:
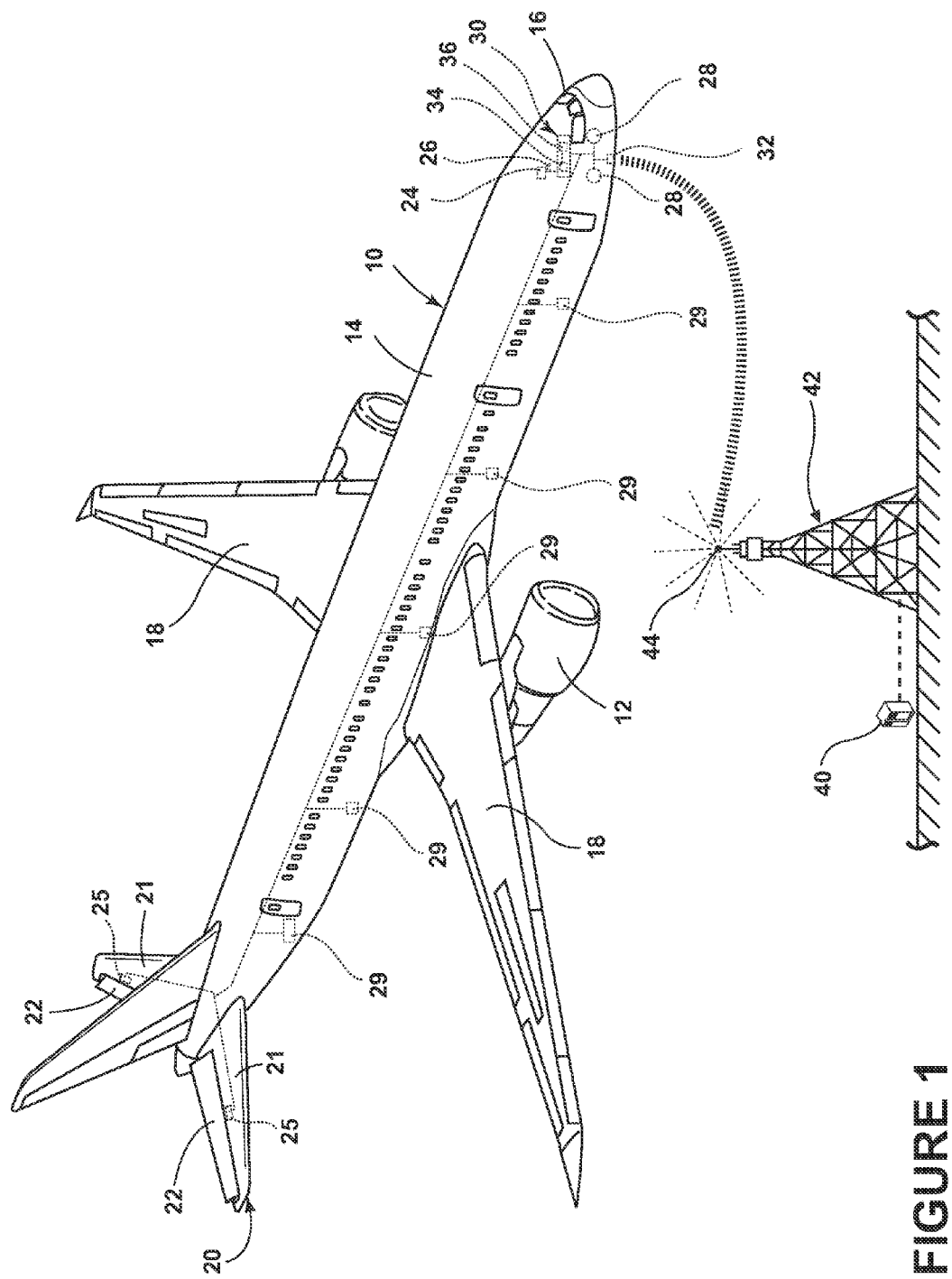
FIG. 1 is a perspective view of the aircraft and a ground station in which embodiments of the invention may be implemented.

FIG. 1 schematically depicts a portion of an aircraft 10 that may execute embodiments of the invention and may include one or more propulsion engines 12 coupled to a fuselage 14, a cockpit 16 positioned in the fuselage 14, and wing assemblies 18 extending outward from the fuselage 14. A horizontal stabilizer system 20 is included in the aircraft 10 and includes horizontal stabilizers 21, which are fixed wing sections extending from a rear portion of the fuselage. There is an elevator 22 for each of the horizontal stabilizers 21, which may include moving sections at the rear of the horizontal stabilizers 21. The elevators 22 may be operably coupled to the fixed horizontal stabilizers 21 by hinges or other mechanisms.

A control mechanism 24 such as a trim lever may be included in the cockpit 16 and may be operated by a pilot to set the position of the elevators 22. The control mechanism 24 may provide an input to a drive 25, which may be used to move the elevators 22 into the position set by the control mechanism 24. The term trim lever as used in this description is not limited to a physical lever, rather it relates to the control device used to set the position of the elevators. Throughout the early part of aviation, this control device was a lever and the term flap handle has now become generic to the control device used to set the elevator position, regardless of whether the control device is an actual lever or a button on a touch-screen user interface. Other control mechanisms including a flap handle may also be included but have not been shown for clarities sake. Further, a sensor such as a control mechanism sensor 26 or other suitable mechanism may be used for determining the position of the control mechanism 24. Further, one or more sensors 28 may be included in the horizontal stabilizer system 20 and each may output data relevant to a characteristic of the pitch of the aircraft 10 during flight. For example, one of the sensors 28 may include a tilt sensor to determine a pitch of the aircraft 10.

A plurality of additional aircraft systems 29 that enable proper operation of the aircraft 10 may also be included in the aircraft 10 as well as a controller 30, and a communication system having a wireless communication link 32. The controller 30 may be operably coupled to the plurality of aircraft systems 29 including the horizontal stabilizer system 20. For example, the horizontal stabilizer drive 25, the control mechanism 24, the control mechanism sensor 26, and the one or more sensors 28 may be operably coupled to the controller 30.

The controller 30 may also be connected with other controllers of the aircraft 10. The controller 30 may include memory 34, the memory 34 may include random access memory (RAM), read-only memory (ROM), flash memory, or one or more different types of portable electronic memory, such as discs, DVDs, CD-ROMs, etc., or any suitable combination of these types of memory. The controller 30 may include one or more processors 36, which may be running any suitable programs. The controller 30 may be a portion of an FMS or may be operably coupled to the FMS.

A computer searchable database of information may be stored in the memory 34 and accessible by the processor 36. The processor 36 may run a set of executable instructions to display the database or access the database. Alternatively, the controller 30 may be operably coupled to a database of information. For example, such a database may be stored on an alternative computer or controller. It will be understood that the database may be any suitable database, including a single database having multiple sets of data, multiple discrete databases linked together, or even a simple table of data. It is contemplated that the database may incorporate a number of databases or that the database may actually be a number of separate databases.

The database may store data that may include historical data related to the reference pitch characteristics as well as historical horizontal stabilizer data for the aircraft 10 and related to a fleet of aircraft. The database may also include reference values including trim rates for the aircraft and expected changes in pitch for those trim rates.

Alternatively, it is contemplated that the database may be separate from the controller 30 but may be in communication with the controller 30 such that it may be accessed by either the controller 30. For example, it is contemplated that the database may be contained on a portable memory device and in such a case, the aircraft 10 may include a port for receiving the portable memory device and such a port would be in electronic communication with controller 30 such that controller 30 may be able to read the contents of the portable memory device. It is also contemplated that the database may be updated through the wireless communication link 32 and that in this manner, real time information such as information regarding historical fleet wide data may be included in the database and may be accessed by the controller 30.

Further, it is contemplated that such a database may be located off the aircraft 10 at a location such as airline operation center, flight operations department control, or another location. The controller 30 may be operably coupled to a wireless network over which the database information may be provided to the controller 30.

While a commercial aircraft has been illustrated, it is contemplated that portions of the embodiments of the invention may be implemented anywhere including in a computer 40 at a ground system 42. Furthermore, database(s) as described above may also be located in a destination server or a computer 40, which may be located at and include the designated ground system 42. Alternatively, the database may be located at an alternative ground location. The ground system 42 may communicate with other devices including the controller 30 and databases located remote from the computer 40 via a wireless communication link 44. The ground system 42 may be any type of communicating ground system 42 such as an airline control or flight operations department.

One of the controller 30 and the computer 40 may include all or a portion of a computer program having an executable instruction set for predicting a horizontal stabilizer fault in the aircraft 10. Such faults may include improper operation of components as well as failure of components. Regardless of whether the controller 30 or the computer 40 runs the program for predicting the fault, the program may include a computer program product that may include machine-readable media for carrying or having machine-executable instructions or data structures stored thereon. Such machine-readable media may be any available media, which can be accessed by a general purpose or special purpose computer or other machine with a processor. Generally, such a computer program may include routines, programs, objects, components, data structures, algorithms, etc. that have the technical effect of performing particular tasks or implement particular abstract data types. Machine-executable instructions, associated data structures, and programs represent examples of program code for executing the exchange of information as disclosed herein. Machine-executable instructions may include, for example, instructions and data, which cause a general purpose computer, special purpose computer, or special purpose processing machine to perform a certain function or group of functions.

It will be understood that the aircraft 10 and computer 40 merely represent two exemplary embodiments that may be configured to implement embodiments or portions of embodiments of the invention. During operation, either the aircraft 10 and/or the computer 40 may predict a horizontal stabilizer fault. By way of non-limiting example, while the aircraft 10 is being operated the control mechanism 24 may be utilized to set the position of the elevators 22 by either trimming up or trimming down the position of the elevators 22. The control mechanism sensor 26 may output a signal indicative of the position of the control mechanism 24 and whether it is being directed to trim up or trim down the aircraft. Further, the sensors 28 may output data relevant to a characteristic of the pitch of the aircraft 10 during flight.

The controller 30 and/or the computer 40 may utilize inputs from the control mechanism sensor 26, the sensors 28, the database(s) and/or information from airline control or flight operations department to predict the horizontal stabilizer fault. Among other things, the controller 30 and/or the computer 40 may analyze the data output by the control mechanism sensor 26 and the one or more sensors 28 over time to determine drifts, trends, steps or spikes in the operation of the horizontal stabilizer system 20. Such anomalies in the data may be too subtle on a day-to-day comparison to make such predictions of fault. The controller 30 and/or the computer 40 may also analyze the horizontal stabilizer data to determine differences between the expected change in pitch and the actual change in pitch. Once a horizontal stabilizer fault has been predicted an indication may be provided on the aircraft 10 and/or at the ground system 42. It is contemplated that the prediction of the horizontal stabilizer fault may be done during flight, may be done post flight, or may be done after any number of flights. The wireless communication link 32 and the wireless communication link 44 may both be utilized to transmit data such that the fault may be predicted by either the controller 30 and/or the computer 40.

Figure 2:
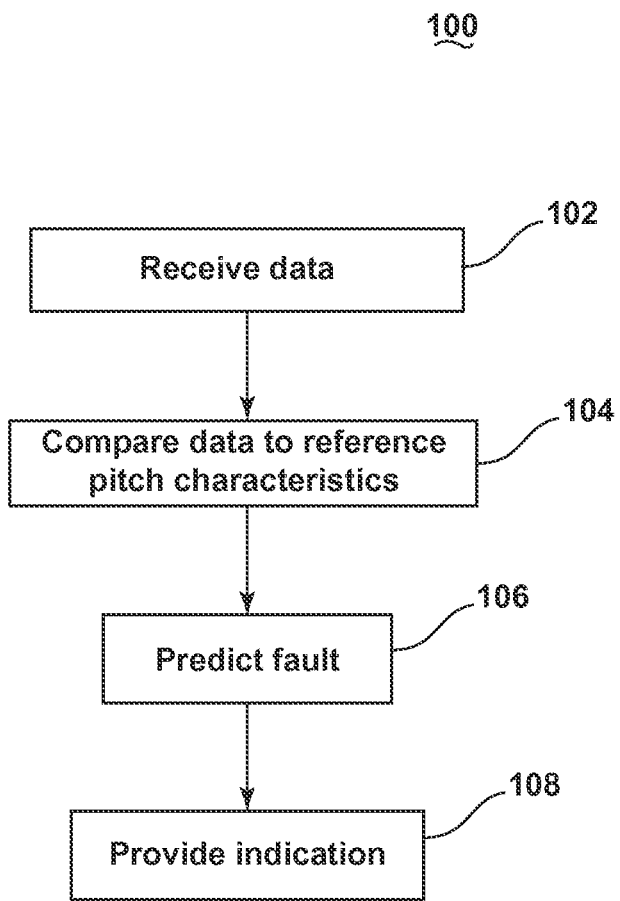
FIG. 2 is a flowchart showing a method of predicting a horizontal stabilizer fault in an aircraft according to an embodiment of the invention.

In accordance with an embodiment of the invention, FIG. 2 illustrates a method 100, which may be used for predicting a horizontal stabilizer fault, which can include a failure. The method 100 begins at 102 by receiving data relevant to a characteristic of the pitch of the aircraft 10 during flight. This may include receiving data from one or more of the sensors 28. It is also contemplated that the received data may be raw aircraft data from which a variety of other information may be derived or otherwise extracted. For example, the raw data that is received may consist of date times, altitudes, flap handle positions, pitch trim positions, on ground/in air information, manual trim commands and autopilot trim commands. From this data information such as a rate of change of pitch may be determined. It will be understood that regardless of whether the data is received directly or derived from received data, the data may be considered to be received data. The data received may include rate of change of the pitch of the aircraft, the median pitch of the aircraft, a median pitch trim rate of the aircraft, median pitch trim position of the aircraft, a count of pitch trim outliers. The data may be received during a number of different regimes. For example, the data may be received during the whole flight, during the longest 'cruise' period, over all cruise periods, takeoff, landing, etc. For example, the median may be determined from data received from different phases of the aircraft flight.

At 104, the received data may be compared to a reference pitch characteristic. The reference pitch characteristic may include any number of reference pitch characteristics related to the horizontal stabilizer system 20 and the aircraft 10. For example, the reference pitch characteristic may include a value related to a minimum acceptable rate of change, predetermined rate of change of pitch of the aircraft in response to a trim up command from the pilot/autopilot, a predetermined rate of change of pitch of the aircraft in response to a trim down command from the pilot/autopilot, etc. The reference pitch characteristic may also include a historical reference pitch characteristic including for example historical data related to the horizontal stabilizer system of the aircraft or historical data for multiple other aircraft. Thus, data received may be compared to results obtained from previous flights for the same aircraft and against the whole fleet of aircraft. Furthermore, the reference pitch characteristic may include a value that has been determined during flight such as by receiving an output of one of the sensors 28. In this manner, it will be understood that the reference pitch characteristic may be defined during operation. Alternatively, the reference positions values may be stored in one of the database(s) as described above.

In this manner, the position signals received from the sensors 28 may be compared to a reference value to define a position comparison. For example, the comparison may include determining a difference between the number of autopilot trim up and trim down commands. The number of times the aircraft is trimmed up or trimmed down may be an indirect indication of how the elevators 22 are performing. In such an instance the received data may be considered the number of autopilot trim up commands and the reference pitch characteristic may be the number of trim down commands, which may be defined during operation.

Alternatively, a more direct indication of how the elevators 22 are preforming may be used including position parameters. For example, the comparison may include comparing the rate of change of the pitch of the aircraft 10 in response to a trim up or a trim down command to a reference pitch characteristic. The comparison may include comparing the rate at which the pitch changes in response to a trim command from the autopilot. The comparison may include determining a difference between the number of autopilot trim up and trim down commands. The comparison may include determining a difference between the expected change in pitch, which may be calculated from the number of manual and autopilot trim commands and known trim rates and the actual change in pitch over a period in cruise. For Example, reference trim rates may include the rates shown in Table 1 below.

TABLE 1

Exemplary Trim Rate References

|  | Autopilot (units per second) | Manual (units per second) |
| --- | --- | --- |
| Flap handle up | 0.09 | 0.2 |
| Flap handle down | 0.27 | 0.4 |

At 106, a fault in the horizontal stabilizer system may be predicted based on the comparison at 104. For example, a fault in the horizontal stabilizer system 20 may be predicted when the comparison indicates the received data is less than a minimum acceptable rate of change. In this manner, the controller 30 and/or the computer 40 may determine if the results of the comparison are acceptable. A fault may also be determined when the comparison indicates that the received data satisfies a predetermined threshold. The term "satisfies" the threshold is used herein to mean that the variation comparison satisfies the predetermined threshold, such as being equal to, less than, or greater than the threshold value. It will be understood that such a determination may easily be altered to be satisfied by a positive/negative comparison or a true/false comparison. For example, a less than threshold value can easily be satisfied by applying a greater than test when the data is numerically inverted.

Any number of faults in the horizontal stabilizer system 20 may be determined including a flight recorder fault, stability sensor fault, autopilot pitch trim rate is too low, autopilot pitch trim rate is too high, pitch trim position is too low, pitch trim position is too high, and that stability trim is inoperable. For example, a flight recorder or stability sensor issue may be determined by the number of pitch trim outliers, the median pitch trim position, the median pitch trim rates and the minimum pitch trim rates. That the autopilot pitch trim rate is too low or too high may be determined by the median pitch trim rates. That the pitch trim position is too low or too high may be determined by the median pitch trim position. That the stability trim is inoperable may be determined by minimum pitch trim rates, difference in the number of autopilot trim commands in both the longest and all cruises and the difference between the expected pitch change and the actual pitch change in the longest cruise.

By way of non-limiting example, the median pitch trim position of the aircraft 10 may be received from sensors 28; the median pitch trim position may then be compared to a predetermined reference median pitch trim position. If the received data is larger than the reference median pitch trim position, then it may be predicted that the pitch trim position is too high and an indication may be provided regarding same.

As a second non-limiting example, the number of manual and autopilot trim up and down commands, along with predetermined reference pitch trim rates, may be used to calculate an expected change in pitch within a given timeframe of a flight. If the difference in the actual change in pitch and the expected change in pitch during this timeframe is greater in magnitude than a predetermined threshold value, then this may be a symptom of a horizontal stabilizer inoperable fault and an indication may be provided regarding the same.

In implementation, the reference pitch characteristic and comparisons may be converted to an algorithm to predict faults in the horizontal stabilizer system 20. Such an algorithm may be converted to a computer program comprising a set of executable instructions, which may be executed by the controller 30 and/or the computer 40. Additional inputs to the computer program may include altitude, flap handle position, pitch trim position, whether the aircraft is in the air or on the ground, autopilot trim down command, autopilot trim up command, manual trim down command, manual trim up command.

At 108, the controller 30 and/or the computer 40 may provide an indication of the fault in the horizontal stabilizer system 20 predicted at 106. The indication may be provided in any suitable manner at any suitable location including in the cockpit 16 and at the ground station 42. For example, if the controller 30 ran the program, then the suitable indication may be provided on the aircraft 10 and/or may be uploaded to the ground system 42. Alternatively, if the computer 40 ran the program, then the indication may be uploaded or otherwise relayed to the aircraft 10. Alternatively, the indication may be relayed such that it may be provided at another location such as such as an airline control or flight operations department.

It will be understood that the method of predicting a horizontal stabilizer fault is flexible and the method illustrated is merely for illustrative purposes. For example, the sequence of steps depicted is for illustrative purposes only, and is not meant to limit the method 100 in any way as it is understood that the steps may proceed in a different logical order or additional or intervening steps may be included without detracting from embodiments of the invention. By way of non-limiting example, the method 100 may also include determining an input to the horizontal stabilizer system 20 that controls a characteristic of the pitch of the aircraft 10 during flight. For example, the input to the horizontal stabilizer system may include a flap handle position and/or a trim input. Furthermore, the method may include receiving data relevant to a median characteristic of the pitch of the aircraft during a number of flights. It is contemplated that different faults may be detected using the results of the comparison over a number of flights. It will be understood that the number of flights used and the various thresholds set are all configurable.

Technical effects of the above described embodiments include that data gathered by the aircraft during flight may be utilized to predict a horizontal stabilizer fault. This allows such predicted faults to be corrected before they occur. Currently the recording of fault occurrences is discretionary and requires the fault to be entered manually into a database this is costly and may not obtain all the relevant information.

Further, there is currently no manner to predict the fault of a horizontal stabilizer. The above described embodiments allows for automatic predicting, recording, diagnosing and alerting to users of faults. The above embodiments allow accurate predictions to be made regarding the horizontal stabilizer system faults. By predicting such problems sufficient time may be allowed to make repairs before such faults occur. This allows for cost savings by reducing maintenance cost, rescheduling cost, and minimizing operational impacts including minimizing the time aircraft are grounded. Further, by automating the recording of such faults, human error is reduced and a given aircraft's history will be more accurate, which may be helpful in future maintenance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of predicting a horizontal stabilizer system fault in an aircraft, the method comprising:
   receiving data relevant to a characteristic of a pitch of the aircraft during flight;
   comparing the received data to a reference pitch characteristic;
   predicting a fault in the horizontal stabilizer system based on the comparison; and
   providing an indication of the predicted fault.

2. The method of claim 1 wherein the received data is related to a rate of change of the pitch of the aircraft.

3. The method of claim 2 wherein the data is received during a cruise phase of flight.

4. The method of claim 2 wherein the reference pitch characteristic is a minimum acceptable rate of change.

5. The method of claim 4 wherein the fault is predicted when the received data is less than a minimum acceptable rate of change.

6. The method of claim 1, further comprising determining an input to the horizontal stabilizer system that controls a characteristic of the pitch of the aircraft during flight.

7. The method of claim 6 wherein the input to the horizontal stabilizer system comprises a flap handle position.

8. The method of claim 6 wherein the input to the horizontal stabilizer system comprises a trim input.

9. The method of claim 6 wherein the comparison is related to a difference between a number of autopilot trim up and trim down commands.

10. The method of claim 6 wherein the reference pitch characteristic is a predetermined rate of change of pitch of the aircraft in response to a trim up command from autopilot.

11. The method of claim 1 wherein the received data is a median pitch trim position of the aircraft.

12. The method of claim 11 wherein the median is determined from data received from different phases of the flight.

13. The method of claim 1 wherein the received data is a median pitch trim rate of the aircraft.

14. The method of claim 1 wherein the received data comprises a count of pitch trim outliers.

15. The method of claim 1 wherein the reference pitch characteristic comprises historical data.

16. The method of claim 15 wherein the historical data includes historical data related to the horizontal stabilizer system of the aircraft.

17. The method of claim 15 wherein the historical data includes historical data for multiple other aircraft.

18. A method for monitoring faults in an aircraft horizontal stabilizer system, the method comprising:
   receiving data relevant to a median characteristic of a pitch of the aircraft during a number of flights;
   comparing the received data to a historical reference pitch characteristic;
   predicting a fault in the horizontal stabilizer system based on the comparison; and
   providing an indication of the predicted fault.

19. The method of claim 18 wherein the fault determined is at least one of a flight recorder fault, stability sensor fault, autopilot pitch trim rate is too low, autopilot pitch trim rate is too high, pitch trim position is too low, pitch trim position is too high, stability trim is inoperable.

20. The method of claim 18 wherein the historical data includes historical data for multiple other aircraft.

* * * * *